United States Patent

Kreutzman et al.

(10) Patent No.: US 6,745,594 B2
(45) Date of Patent: Jun. 8, 2004

(54) IN-CAR HYDRATION SYSTEMS

(75) Inventors: Kurt Kreutzman, Cary, IL (US); Don Prestley, Crystal Lake, IL (US); Dennis Broeske, Wonder Lake, IL (US); Steve Ehardt, Algonquin, IL (US); John R. Califf, Carpentersville, IL (US); John Konieczka, Lake Barrington, IL (US); Jeff Zachwieja, Cary, IL (US)

(73) Assignee: Stokley-Van Camp, Inc., Chicago, IL (US)

( * ) Notice: Subject to any disclaimer, the term of this patent is extended or adjusted under 35 U.S.C. 154(b) by 0 days.

(21) Appl. No.: 10/268,435

(22) Filed: Oct. 10, 2002

(65) Prior Publication Data

US 2004/0069007 A1 Apr. 15, 2004

(51) Int. Cl.$^7$ ................................................. F25D 3/08
(52) U.S. Cl. ....................................... 62/457.2; 62/400
(58) Field of Search ............................ 62/457.2, 457.3, 62/457.4, 400, 389; 222/80, 81

(56) References Cited

U.S. PATENT DOCUMENTS

| | | |
|---|---|---|
| 581,767 A | 5/1897 | Powers |
| 2,969,064 A | 1/1961 | Metz ............................ 128/222 |
| 3,179,085 A | 4/1965 | McKillip, Jr. ................... 119/75 |
| 3,289,635 A | 12/1966 | Eagles ........................ 199/72.5 |
| 3,646,955 A | 3/1972 | Olde ............................ 137/382 |
| 3,698,431 A | 10/1972 | Thompson ................... 137/604 |
| 3,698,685 A | 10/1972 | Lang ............................ 251/303 |
| 3,734,063 A | 5/1973 | Atchley ....................... 119/72.5 |
| 4,090,650 A | 5/1978 | Gotta ............................... 224/5 |
| 4,274,566 A | 6/1981 | Rowe ............................ 224/35 |
| 4,370,948 A | 2/1983 | Atkins ........................ 119/72.5 |
| 4,403,570 A | 9/1983 | Freehafer .................... 119/72.5 |
| 4,526,298 A | 7/1985 | Boxer et al. ................. 222/130 |
| 4,573,433 A | 3/1986 | Thompson ................... 119/72.5 |
| 4,629,098 A | 12/1986 | Eger ............................ 222/175 |
| 4,739,905 A | 4/1988 | Nelson ......................... 222/145 |
| 4,813,083 A | 3/1989 | Davidson ......................... 2/422 |
| 4,815,635 A | 3/1989 | Porter .......................... 222/136 |
| 4,852,781 A | 8/1989 | Shurnick et al. ............. 224/148 |
| 4,911,339 A | 3/1990 | Cushing ....................... 222/610 |
| 4,921,141 A | 5/1990 | Branum .................... 222/146.6 |
| 4,948,023 A | 8/1990 | Tripp ........................... 224/148 |
| 4,974,903 A | 12/1990 | Lipschitz et al. ............ 297/188 |
| 5,003,927 A | 4/1991 | Thompson ................... 119/72.5 |
| 5,060,833 A | 10/1991 | Edison et al. ................ 224/148 |
| 5,062,591 A | 11/1991 | Runkel ......................... 224/148 |
| 5,085,349 A | 2/1992 | Fawcett ........................ 222/175 |
| 5,104,016 A | 4/1992 | Runkel ......................... 224/148 |
| 5,143,390 A | 9/1992 | Goldsmith ................... 280/201 |
| 5,148,950 A | 9/1992 | Hosaka ......................... 222/175 |
| 5,158,218 A | 10/1992 | Wery ............................ 222/610 |

(List continued on next page.)

FOREIGN PATENT DOCUMENTS

FR 2595678 9/1987

OTHER PUBLICATIONS

English abstract re French patent No. FR 2,595,678, published Sep. 18, 1987.

*Primary Examiner*—Melvin Jones
(74) *Attorney, Agent, or Firm*—Cook, Alex, McFarron, Manzo, Cummings & Mehler, Ltd.

(57) ABSTRACT

Systems and methods for a liquid delivery system for a race vehicle to provide the driver of the race vehicle with readily available cool fluids are disclosed. One embodiment is directed to an insulated shell system mounted in the race vehicle which holds a bottle of fluid within the shell. Another embodiment is directed to an insulated pouch mounted in the race vehicle which has a collapsible fluid bladder, a gas bladder and a gel pack within the pouch. Each embodiment has tubing which connects to a valve near the driver's mouth.

61 Claims, 4 Drawing Sheets

U.S. PATENT DOCUMENTS

| | | | |
|---|---|---|---|
| 5,201,442 A | 4/1993 | Bakalian | 222/610 |
| 5,215,231 A | 6/1993 | Paczonay | 222/610 |
| 5,265,769 A | 11/1993 | Wilson | 222/175 |
| 5,282,557 A | 2/1994 | McCook | 224/211 |
| 5,326,124 A | 7/1994 | Allemang | 280/288 |
| 5,358,142 A | 10/1994 | Holmes | 222/1 |
| 5,431,308 A | 7/1995 | Tchen | 222/175 |
| 5,484,405 A | 1/1996 | Edstrom, Sr. | 604/77 |
| 5,566,869 A | 10/1996 | Katz | 224/148.6 |
| 5,571,260 A | 11/1996 | Krug | 222/175 |
| 5,597,087 A * | 1/1997 | Vinarsky | 220/482 |
| 5,601,207 A | 2/1997 | Paczonay | 220/703 |
| 5,601,221 A | 2/1997 | Karr | 224/148.2 |
| 5,607,087 A | 3/1997 | Wery | 222/610 |
| 5,634,343 A * | 6/1997 | Baker, III | 62/3.64 |
| 5,645,404 A | 7/1997 | Zelenak | 417/1 |
| 5,699,933 A | 12/1997 | Ho et al. | 220/703 |
| 5,722,573 A | 3/1998 | Carnel | 224/148.2 |
| 5,727,714 A | 3/1998 | Fawcett | 222/175 |
| 5,730,336 A | 3/1998 | Lerner | 222/490 |
| 5,755,368 A | 5/1998 | Bekkedahl | 224/414 |
| 5,791,510 A | 8/1998 | Paczonay | 220/714 |
| 5,806,726 A | 9/1998 | Ho | 222/529 |
| 5,894,955 A | 4/1999 | Garrigues | 222/61 |
| 5,911,406 A | 6/1999 | Winefordner et al. | 251/339 |
| 5,913,456 A | 6/1999 | Dikeman | 222/95 |
| 5,924,678 A | 7/1999 | Olde | 251/348 |
| 5,970,523 A | 10/1999 | Atkins | 2/209.1 |
| 5,984,145 A | 11/1999 | McAllister | 222/175 |
| 6,032,831 A | 3/2000 | Gardner et al. | 222/175 |
| 6,050,444 A | 4/2000 | Sugg | 220/707 |
| 6,062,435 A | 5/2000 | Hess, III | 220/175 |
| 6,070,767 A | 6/2000 | Gardner et al. | 222/175 |
| 6,145,695 A | 11/2000 | Garrigues | 220/705 |
| 6,199,729 B1 | 3/2001 | Drzymkowski | 224/148.2 |
| 6,220,490 B1 | 4/2001 | O'Hara | 224/148.2 |
| 6,241,575 B1 | 6/2001 | Shailer | 450/38 |
| 6,247,619 B1 | 6/2001 | Gill et al. | 222/105 |
| 6,264,166 B1 | 7/2001 | Bowland et al. | 251/144 |
| 6,283,344 B1 | 9/2001 | Bradley | 224/148.2 |
| 6,364,168 B1 | 4/2002 | Gardner et al. | 222/175 |
| 6,494,056 B1 * | 12/2002 | Roth et al. | 62/457.3 |
| 6,584,800 B1 * | 7/2003 | Roth et al. | 62/457.3 |

* cited by examiner

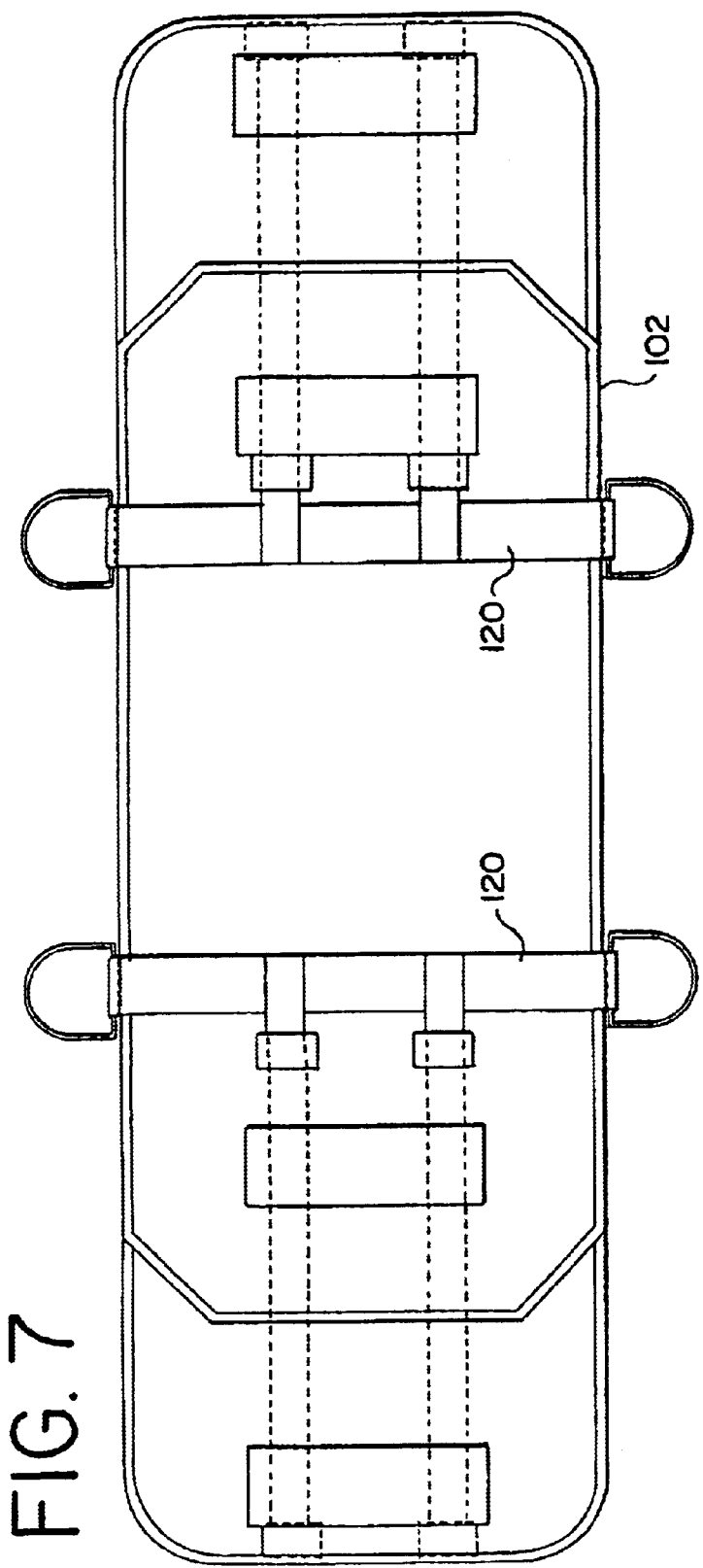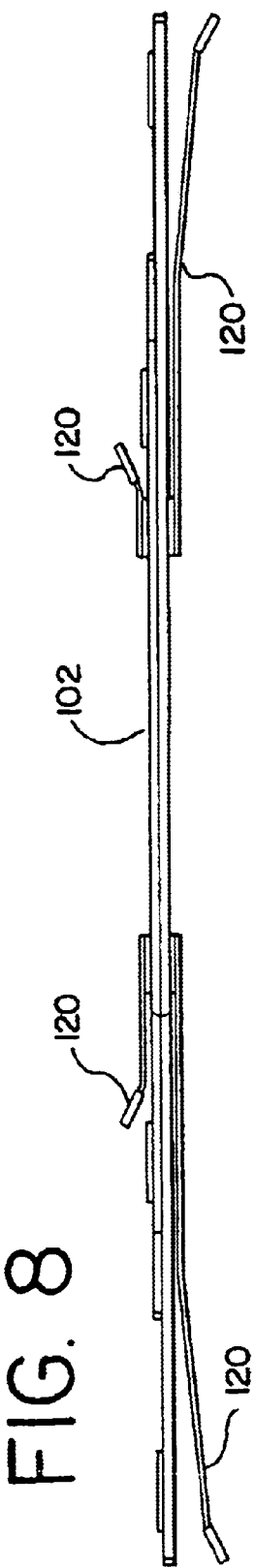

IN-CAR HYDRATION SYSTEMS

FIELD OF THE INVENTION

The present invention is directed to an in-car hydration system. In particular, the present invention is directed to systems for storing a beverage, such as an isotonic sports drink, in a vehicle, keeping it cool, and permitting easy and quick access to the drink by the driver of the vehicle. More specifically, the system is for use in a race car or truck for use by the driver during the race.

BACKGROUND OF THE INVENTION

Hydration of a race car driver is extremely important. During a race, a race car driver wears a protective suit and helmet. There is no air conditioning in a race car. Further, many races are run in summer and/or in the Southern U.S.A. As a result, the race car driver experiences a large amount of fluid loss during the race. In order for the driver to be able to successfully finish the race, he or she will need to replenish the fluids lost or suffer a serious case of dehydration, cramps or both. Furthermore, in order to not only finish the race but to receive the maximum hydration benefit, the driver needs to replace the electrolytes (sodium and potassium) lost throughout the race.

Additionally, a race car is traveling at speeds approaching and often exceeding 200 mph. Since the race track is shared by upwards of 30 cars, it is important that the driver keep his hands on the steering wheel and stick shift and his feet on the gas pedal, clutch and brake and that there be a minimal use of his hands or feet for other activities, such as drinking fluids.

Present systems used in race cars, such as in NASCAR races, include water bottles, mounted thermos with flexible tubing used like a straw, or a fluid bag in a pouch with flexible tubing used like a straw, such as a system available from BSR racing products. These systems, however, suffer from a number of disadvantages. For example, using a water bottle forces the driver to remove a hand from the controls in order to grasp and drink from the water bottle. Further, such a movement distracts the driver's attention from driving, not only hurting his performance during the race but also threatening his safety and those around him. The other systems provide similar distractions. Because of the districting nature of these systems, the driver may choose not to drink, resulting in dehydration and poor performance.

In addition, it would be beneficial if the replacement fluid was maintained cold throughout the race. A driver is much more likely to drink more fluid, and stay better hydrated, if the fluid is cold. Additionally, the liquids should be available to the driver any time he desires a drink. Because of the inadequate systems in place, more often than not, drivers only drink during caution laps or pit stops.

Furthermore, because the weight of the race car is so strictly regulated and controlled, it is important that the hydration system be as light as possible and not weigh much more than the fluid itself.

There are numerous patents directed to systems, devices and methods for dispensing liquids to humans. Many of these include designs for hands-free operation. Most of these have designs which are specifically directed to a particular application, such as for example, on a bicycle or for running. Very few are directed to use in a car or more specifically are designed to withstand the rigors and demands of auto or truck racing.

The present invention is directed to systems and methods for overcoming these drawbacks and meeting these objections in order to provide a driver of a race vehicle with cool liquids anytime he desires, without compromising his or her driving.

SUMMARY OF THE INVENTION

The present invention is directed to systems and methods for delivering liquid to a driver of a race vehicle.

One embodiment of the present invention is a hydration system to be located within the race vehicle and which includes a shell with inner and outer walls and freezer gel in between. A bottle of liquid is placed within the shell. The shell has a lid to keep the bottle in the shell. Tubing is coupled to the bottle in the shell and is used to transfer the liquid from the bottle to a valve in close proximity to the driver, preferably near the driver's mouth. The fluid is then available to the driver through the valve anytime he desires. Preferably, the shell is held or mounted onto the race vehicle.

In one alternative of this embodiment, a modified cap with multiple ports with disconnectors in the cap is placed on the bottle. The bottle is then placed in the shell. The ports mate with ports in the shell allowing circulation of the fluid in and out of the bottle. A pump can be connected to the tubing to move the liquid from the bottle to the valve. When the bottle of liquid with the modified cap is placed in the shell and the pump activated, the liquid within the bottle is able to flow from the bottle, through the cap and tubing to the valve and back to the bottle. As a result, the liquid is available to the driver as desired.

Another embodiment of the present invention is directed to a hydration system having an insulated pouch to be mounted within and preferably on the race vehicle. The insulated pouch holds a reservoir which includes a collapsible bladder for holding a liquid and a gas bladder for holding pressurized gas to apply pressure against the bladder of liquid. At least one gel pack for keeping the liquid cool is located either in the insulated pouch, in the reservoir or in both. Tubing is used to connect the collapsible bladder to a valve near the driver's mouth. The pressurized gas in the gas bladder puts pressure on the collapsible bladder and will force the liquid out of the collapsible bladder through the tubing to the valve when the driver wishes to drink. A bite valve can be used by the driver to activate the system.

In a preferred embodiment, the fluid used in each of the above embodiments is an isotonic sports drink.

Methods using these embodiments are also contemplated in this invention.

The present invention provides either a hands-free hydration system wherein the driver can drink fluids during the race without having to remove his hands from the controls of the car or a system which requires minimal use of the driver's hands or feet. The present invention also provides a hydration system which allows the driver to drink fluids without taking his eyes off the track or road.

The present invention also provides a system wherein the fluids within the system will be maintained cool for the duration of the race.

The present invention also provides a system in which little weight beyond the fluid is added to the race vehicle.

The present invention is not limited to race cars but can also be used, for example, in race trucks.

BRIEF DESCRIPTION OF THE DRAWINGS

FIG. 7 shows a bottom view of an insulated pouch of the second embodiment.

FIG. 8 shows a side view of an empty pouch of the second embodiment.

DETAILED DESCRIPTION OF THE PRESENTLY PREFERRED EMBODIMENTS

Figure 1:
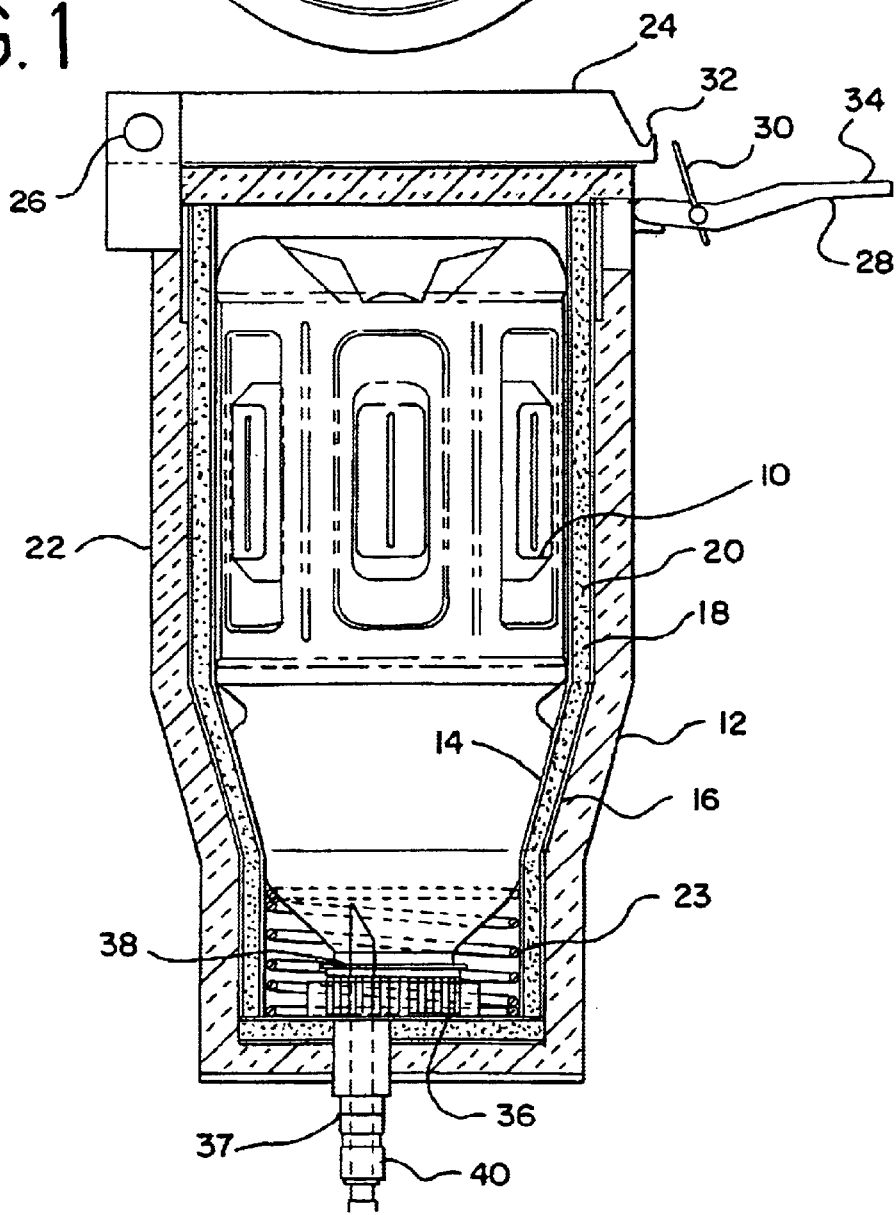
FIG. 1 is a cross-sectional view of a first embodiment of an in-car hydration system of the present invention.

A first embodiment of the present invention is illustrated in FIG. 1. This embodiment is intended to hold a bottle 10 of a fluid within an enclosed shell 12. Preferably, the shell 12 has an inner wall 14 and an outer wall 16. These walls 14 and 16 can be made of carbon fiber, aluminum or similar type materials. Carbon fiber is presently preferred as it is lighter than aluminum. Preferably, walls 14 and 16 are approximately 0.050 inches thick. Walls 14, 16 create an inner evacuated space 18 between the walls. In a preferred embodiment, the inner evacuated space is ¼ inch wide. A freezer gel 20, such as for example Polyfoam UTEK+30° F. freezer gel, can be placed in this inner evacuated space 18. When frozen, gel 20 will keep the fluid within bottle 10 cold during the race. In a further embodiment, a layer of insulation 22 is placed around outer wall 16. Layer 22 can be made of for example Ethylene Vinyl Acetate (EVA) foam which is a close cell foam with high tear strength. Another possible insulation is a vacuum insulation produced by Nanogel. Other similar substances could also be used. Preferably, layer 22 is between ¼ inch–½ inch thick. Layer 22 will help keep the liquid cold during the race. Preferably, the liquid will be maintained at a refrigerator temperature throughout the race.

Figure 2:
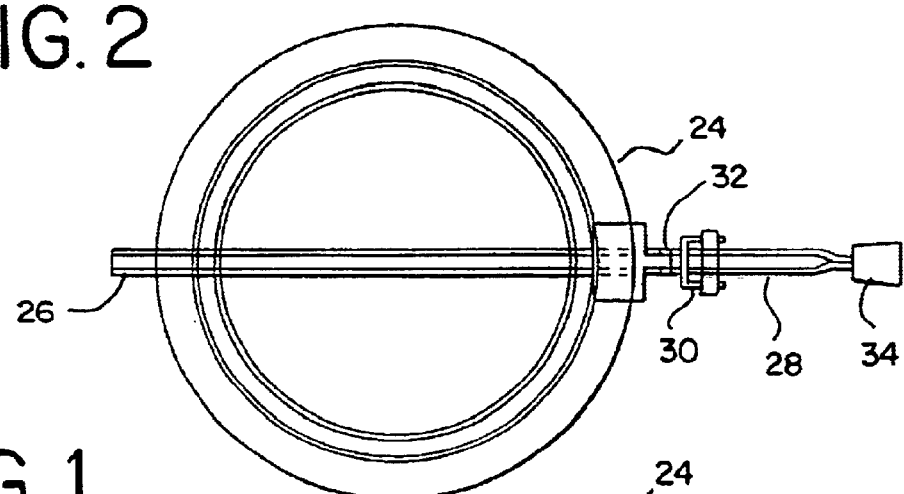
FIG. 2 is a top view of the lid and latch mechanism of the system of FIG. 1.

In order to keep bottle 10 within shell 12, shell 12 has a lid 24. In a preferred embodiment, lid 24 has a pivot point hinge 26. The lid 24 pivots open on hinge 26 to provide complete and easy access for putting a new bottle in shell 12 and for removing a used bottle. A latching or locking mechanism 28 can be located on shell 12 to lock the lid and bottle in place. In one embodiment, latching mechanism 28 can include a D-ring 30 which hooks on a hook 32 on lid 24. Latching mechanism 28 can also include a handle 34. Handle 34 can be used to hook ring 30 on hook 32 and then clamp and lock lid 24 on shell 12 by pressing handle 34 against the shell. The lid, latch mechanism and hinge can be made of aluminum, carbon fiber or similar material. FIG. 2 shows a top view of lid 24 and latching mechanism 28.

Preferably, shell 12 is designed to hold a 64 ounce bottle of an isotonic beverage, such as for example GATORADE®. However, other size beverage containers and other types of beverages, including water, are also within the scope of the present invention. In addition, while the preferred embodiment holds a plastic bottle, the present invention is not limited to use of plastic bottles.

In a further embodiment, a spring 23 is located at the bottom of shell 12. Spring 23 allows bottle 10 to be spring loaded in shell 12. As a result, when lid 24 is opened, bottle 10 will spring out for easy removal of the bottle.

The system of this embodiment is contemplated both for use with a single bottle of fluid for the entire race or replacement of the bottle with another bottle during the race. For example, if it is desired to change the bottle at a pit stop, the driver or crew member merely has to open the lid, and the bottle will pop up. He or she can discard that bottle, pop another bottle into the shell, close the lid and quickly be out of the pit stop.

In FIG. 1, bottle 10 has a standard cap 36 such as that found on a bottle bought from a store. At the bottom of shell 10 is a sharp-tipped apparatus 38 to puncture cap 36. Apparatus 27 can be made of plastic, metal or similar material and is connected to flexible tubing 40. Tubing 40 can be for example FDA 3A Tygon tubing approved for food industry use, beverage grade. Tubing 40 should be long enough to reach from shell 10 to the driver's mouth. At the end of the tubing, opposite apparatus 36, is a valve. A swagelok fitting 37 preferably connects tip apparatus 38 and tubing 40.

Accordingly, when bottle 10 is placed in shell 12, apparatus 38 punctures cap 36. Fluid then flows into tubing 40. Tubing 40 is connected to a valve near the driver's mouth. The fluid is available to the driver by sucking or sipping on the valve. Alternatively, as described below, a pump may be used to circulate the fluid.

Figure 3:
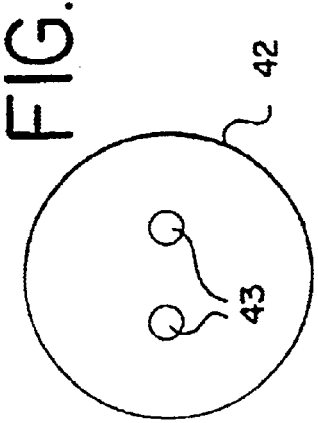
FIG. 3 is a top view of a cap for use with the in-car hydration system of FIG. 1.

In an alternative embodiment, a modified cap 42 can be screwed on bottle 10 to replace the original cap on the bottle. Preferably, cap 42 is made out of polypropylene. It has dual ports 43 with single shut off quick disconnect connectors imbedded in the body of the cap. Cap 42 mates with two nipple-like ports inside shell 12 such that when the system is engaged, fluid is allowed to bypass the shut-offs and circulate in and out of the bottle. This is done so that the fluid will stay cool throughout the race and will not warm up sitting in the tubing. FIG. 3 shows an example of the top of such a cap. Cap 42 is coupled to tubing 40 and to a valve near driver's mouth. Quick disconnectors can also be located on the tubing to disconnect the shell system from the tubing and valve. Preferably, a bite valve is used. By biting on the valve, fluid will be delivered into the driver's mouth. Many bite valves are available. One example of a possible bite valve that can be used with the present invention is a Camelbak Big Bite Valve.

Preferably, a pump is used to move fluid from shell 12 to the valve. One example of such a pump is a positive displacement gear pump run off a 12 volt battery. Other pumps that can be used include a diaphragm pump, a vane pump, a piston pump, a centrifugal pump, and a peristaltic pump. Each type of pump can be of a generally know construction.

In a further embodiment, a button is located near the driver to operate the pump. The button can be located where the driver can easily access it with his hand or foot. Once the driver hits the button, the pump will begin operating and will begin pumping fluid making the fluid available to the driver. The pump also recirculates the fluid back through the bottle in the shell. This maintains the liquid at a cool temperature. Otherwise, the fluid in the tube would become warm by exposure for an extended period of time to heat in the vehicle, without the insulated protection of the shell.

Figure 4B:
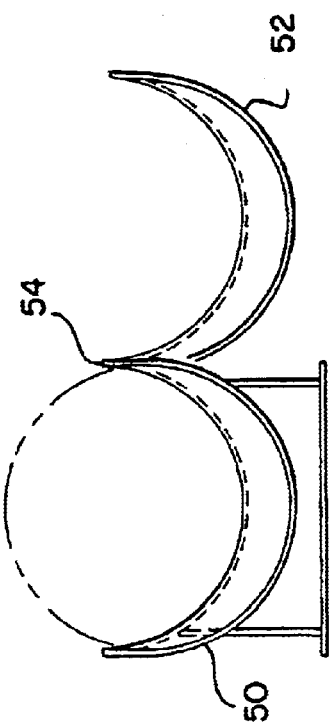
FIGS. 4a–4c illustrate a bracket for holding the hydration system of FIG. 1 in the race vehicle.
Figure 4C:
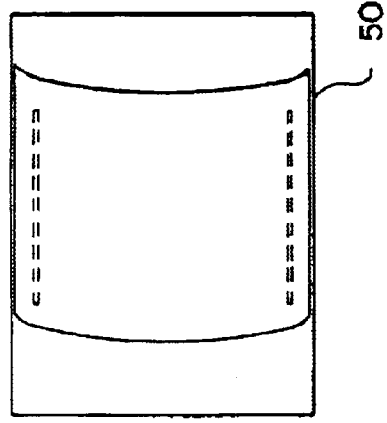
Figure 4A:
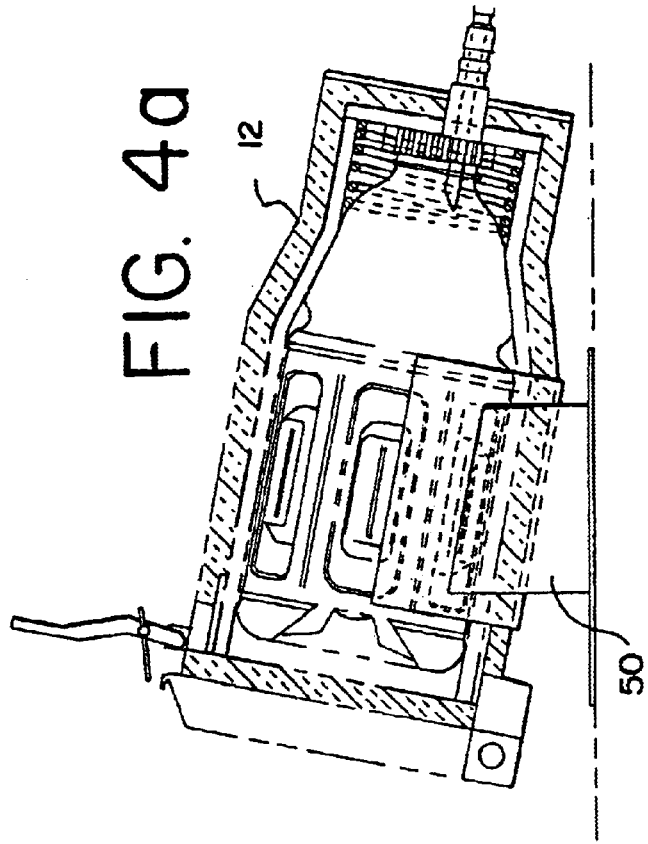

Preferably, shell 12 with lid 24 are intended to be placed in a bracket 50 within the race vehicle. For example, this bracket could be placed on the floor of the driver's cockpit, preferably on the right side of the driver's cockpit so as to be out of his way, and riveted or welded to the floor. FIGS. 4a, 4b, 4c show an example of bracket 50 which could be used to hold shell 12 in a race vehicle. The radius of bracket 50 will be determined by the size of shell 12. The size of shell 12 is dependent upon the size of the bottle which is to be placed in the shell.

Shell 12 can be held in bracket 50 by various fastening apparatus. For example, zip ties, cable ties or similar devices can be placed on shell 12 and attached to each side of bracket 50 to hold shell 12 on the bracket. Alternatively, as shown in FIG. 4b, bracket 50 could have a top half 52 which is connected by a hinge 54 to one side of bracket 50. The top half 52 of the bracket would fold over shell 12 within bracket 50 and be fastened to the side of bracket 50 opposite of the hinge.

Figure 5:
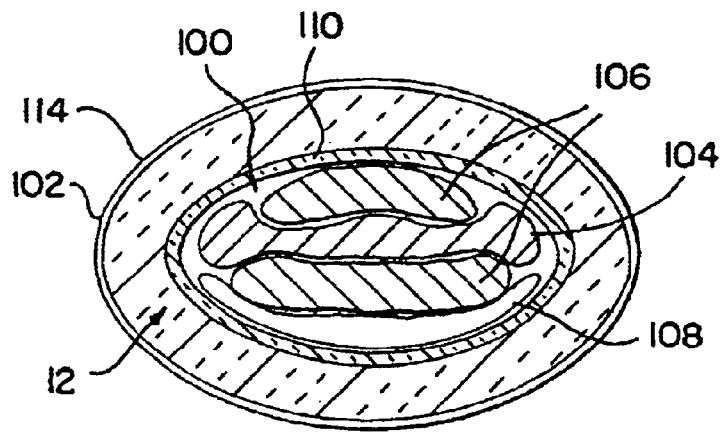
FIG. 5 is a cross-sectional view of a second embodiment of an in-car hydration system of the present invention.

A second embodiment of the present invention is shown in FIG. 5. In the system of this embodiment, a durable plastic bag or reservoir 100 holds fluid, such as for example an isotonic fluid like GATAORADE® or plain water. The reservoir 100 is placed in an insulated pouch 102. In a preferred embodiment, reservoir 100 will hold 100 ounces of fluid. The present invention, however, is not limited to such a size, as different sizings can be provided as desired and/or more or less fluid can be in reservoir 100 as needed for the race.

FIG. 5 is a cross sectional view of one alternative of the system of this embodiment. In this system, reservoir 100 includes a bladder 104 which holds the fluid inside. Examples of bladders which can be used include those made by MSR, Platypus and Bi-Polar. Freezer gel packs 106 are located within reservoir 100 and around bladder 104 to keep the fluid cool. Preferably, a gas bladder 108 is also provided within the reservoir 100. Gas bladder 108 keeps bladder 104 under pressure so that when the driver bites down on the bite valve, fluid will be delivered into the driver's mouth. Preferably, gas bladder 108 is filled with $CO_2$ or other inert gas. Typically, it is coupled to a canister containing the gas (not shown). Preferably, gas bladder 108 is under 7 psi of pressure. The outside of the reservoir is a fabric bag 110.

As shown in FIG. 5, reservoir 100 is placed in insulated pouch 102. Insulated pouch 102 preferably includes about 1 inch of EVA foam insulation 112 and a shell 114. Shell 114 can be made of foil so as to reduce accumulation of radiant or conductive heat. An example of such a foil is a reflective mylar coated glass strand weave material. Alternatively, freezer gel packs can be included within insulated pouch 102, instead of within reservoir 100. In another alternative, a freezer gel component can be part of fluid bladder 104. Bi-Polar sells a bladder with such a design.

Figure 6:
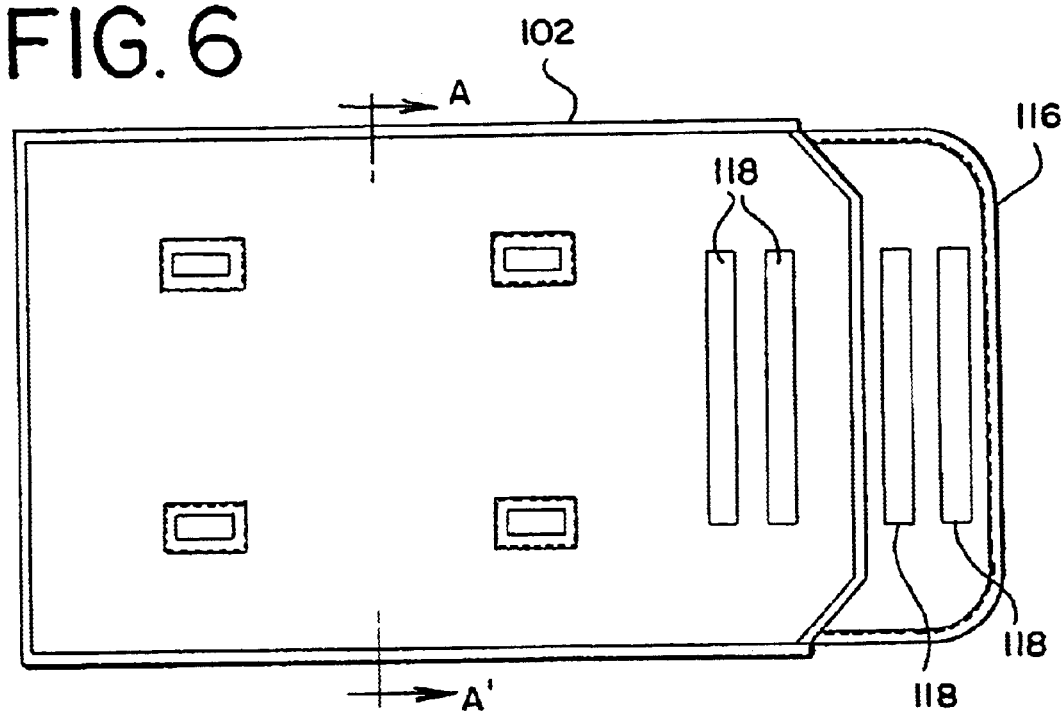
FIG. 6 shows a top view of an insulated pouch of the second embodiment.

FIG. 6 shows a top view of an example of pouch 102. FIG. 5 is taken along line A—A of FIG. 6. Reservoir 100 fits within pouch 102. Preferably, pouch 102 has a flap 116 to keep reservoir 100 in the pouch during the race. In order to keep flap 116 closed, a fastening apparatus is used, such as hook and loop strips 118, such as for example VELCRO®, or a buckle and strap (not shown), or both. Alternatively, a zipper or other fastening apparatus could be used.

FIGS. 7 and 8 illustrate straps 120 which can be used to fasten pouch 102 to, for example, a roll bar in the race vehicle. In a preferred embodiment, pouch 102, with reservoir 100, can be mounted or hung from the roll bar of a race vehicle. So as to not obstruct the driver's vision, the pouch can be hung securely on the right side of the driver's cockpit. Preferably, flexible tubing, such as that described in the first embodiment, is connected to the reservoir through the pouch. At the other end of the tube is a bite valve, such as that described above. By biting on the valve, fluid will be delivered into the driver's mouth.

Instead of a bite valve, the present invention also contemplates that an arrangement can be provided to allow the driver to access the fluid by sucking or sipping. For example, a tip can be placed on the end of the flexible tubing on which the driver could suck or sip the fluid.

In any of the embodiments of the present invention, the tubing and valve can be fed to the driver's mouth in a number of different ways. For example, a hole can be drilled through the driver's helmet. The flexible tubing is inserted through the hole and on the inside of the helmet, attached to the valve. Preferably, the valve should be in close proximity to the driver's mouth but not continuously in the mouth. Alternatively, the flexible tubing can inserted through the visor area of the helmet or under the helmet and up by the chin. In any case, the valve would be placed in close proximity to the driver's mouth.

In order to keep the flexible tubing from getting in the driver's way, the tubing can be attached to the driver's suit or to the restraint structures within the vehicle. Preferably, the tubing would be attached with a hook and loop material, such as VELCRO®, and/or other quick disconnect devices so that the driver can become quickly disconnected from the tubing if it is necessary for him to quickly leave the car.

It will be understood that the embodiments and examples of the present invention, which have been described, are illustrative of some of the applications of the principles of the present invention. Numerous modifications may be made by those skilled in the art without departing from the true spirit and scope of the invention.

What is claimed is:

1. A liquid delivery system for a driver of a race vehicle comprising:
    a circular shell having an inner wall, an outer wall and freezer gel in between said walls, said shell being capable of holding a bottle of liquid therein;
    a lid on said shell for holding said bottle within said shell;
    a sharp-tipped apparatus located at the bottom of said shell for puncturing a cap on said bottle;
    tubing having two ends with one end connected to said sharp-tipped apparatus; and
    a valve connected to the other end of said tubing,
    wherein when said bottle of liquid is placed in said shell, said sharp-tipped apparatus punctures the cap on said bottle and the liquid within the bottle is able to flow from the bottle, through the sharp-tipped apparatus and tubing to said valve, the liquid is then available to the driver as desired.

2. The system of claim 1 further comprising a layer of insulation around said shell.

3. The system of claim 1 wherein said lid has a pivot point hinge and a hook and said shell has a latching mechanism including a D-ring and a handle, wherein the D-ring hooks on said hook and said handle clamps said lid on said shell.

4. The system of claim 1 further comprising a spring located at the bottom of said shell for spring loading said bottle of liquid in said system.

5. The system of claim 1 further comprising a pump coupled to said tubing to move liquid between said bottle to said valve.

6. The system of claim 1 further comprising a bracket mounted in said race vehicle for holding said system in said race vehicle.

7. The system of claim 6 wherein said bracket comprises two halves, the first half holding said shell therein and the second half which closes over said shell and is fastened to said first half to lock said shell in place.

8. The system of claim 1 wherein said fluid is an isotonic fluid.

9. The system of claim 1 wherein said tubing is inserted through a hole in the driver's helmet and said valve is located within the helmet and in close proximity to the driver's mouth.

10. The system of claim 1 wherein said tubing is inserted through the visor area of the driver's helmet and said valve is located within the helmet and in close proximity to the driver's mouth.

11. The system of claim 1 wherein said tubing is inserted under the driver's helmet and said valve is located within the helmet and in close proximity to the driver's mouth.

12. The system of claim 1 wherein said tubing is attached to the driver's racing suit.

13. The system of claim 12 wherein said tubing is attached to the driver's racing suit using hook and loop material.

14. The system of claim 1 wherein said tubing is fastened to said race vehicle so that the tubing will not interfere with the driver operating the race vehicle.

15. The system of claim 1 wherein said shell is mounted on the floor of the race vehicle and to the right of the driver.

16. A liquid delivery system for a driver of a race vehicle comprising:
 a circular shell having a first set of ports, an inner wall, an outer wall and freezer gel in between said walls, said shell being capable of holding a bottle of liquid therein;
 a lid on said shell for holding said bottle within said shell;
 a cap for said bottle, said cap having a second set of ports with shut-off disconnectors within the cap, said second set of ports mating with said first set of ports to circulate fluid in and out of said bottle;
 tubing having two ends with one end connected to said cap;
 a valve connected to the other end of said tubing; and
 a pump coupled to said tubing to move liquid between said bottle and said valve,
 wherein when said bottle of liquid with said cap is placed in said shell, the liquid within the bottle is able to flow from the bottle, through the cap and tubing to said valve and back to said bottle when said pump is activated, and the liquid is available to the driver as desired.

17. The system of claim 16 wherein said valve is a bite valve.

18. The system of claim 16 further comprising a layer of insulation around said shell.

19. The system of claim 16 wherein said lid has a pivot point hinge and a hook and said shell has a latching mechanism including a D-ring and a handle, wherein the D-ring hooks on said hook and said handle clamps said lid on said shell.

20. The system of claim 16 further comprising a spring located at the bottom of said shell for spring loading said bottle of liquid in said system.

21. The system of claim 16 further comprising a bracket mounted in said race vehicle for holding said system in said race vehicle.

22. The system of claim 21 wherein said bracket comprises two halves, the first half holding said shell therein and the second half which closes over said shell and is fastened to said first half to lock said shell in place.

23. The system of claim 16 wherein said tubing is inserted through a hole in the driver's helmet and said valve is located within the helmet and in close proximity to the driver's mouth.

24. The system of claim 16 wherein said tubing is inserted through the visor area of the driver's helmet and said valve is located within the helmet and in close proximity to the driver's mouth.

25. The system of claim 16 wherein said tubing is inserted under the driver's helmet and said valve is located within the helmet and in close proximity to the driver's mouth.

26. The system of claim 16 wherein said tubing is attached to the driver's racing suit.

27. The system of claim 16 wherein said tubing is attached to the driver's racing suit using hook and loop material.

28. The system of claim 16 wherein said tubing is fastened to said race vehicle so that the tubing will not interfere with the driver operating the race vehicle.

29. The system of claim 16 further comprising quick disconnectors on said tubing.

30. The system of claim 16 further comprising a button on said race vehicle, said button electrically coupled to said pump for activating said pump when fluid is desired.

31. The system of claim 16 wherein said fluid is an isotonic fluid.

32. A liquid delivery system for a driver of a race vehicle comprising:
 a circular shell having a first set of ports, an inner wall, an outer wall, freezer gel in between said walls and a layer of insulation around said shell, said shell being capable of holding a bottle of liquid therein;
 a lid on said shell for holding said bottle within said shell, said lid having a pivot point hinge and a hook and said shell has a latching mechanism including a ring and a handle, wherein the ring hooks on said hook and said handle clamps said lid on said shell;
 a spring located at the bottom of said shell for spring loading said bottle of liquid in said system;
 a cap for said bottle, said cap having a second set of ports with shut-off disconnectors within the cap, said second set of ports mating with said first set of ports to circulate fluid in and out of said bottle;
 tubing having two ends with one end connected to said cap;
 a valve connected to the other end of said tubing;
 a pump coupled to said tubing to move liquid between said bottle and said valve; and
 a bracket for mounting said shell to said race vehicle,
 wherein when said bottle of liquid with said cap is placed in said shell, the liquid within the bottle is able to flow from the bottle, through the cap and tubing to said valve and back to said bottle when said pump is activated, and the liquid is available to the driver as desired.

33. A hydration system for a driver of a race vehicle comprising:
 a portable reservoir including
  a collapsible bladder for holding a liquid; and
  a gas bladder for holding pressurized gas;
 at least one gel pack for keeping said liquid cool;
 an insulated pouch for holding said reservoir;
 tubing having two ends with one end coupled to said collapsible bladder; and
 a valve connected to the other end of said tubing,
 wherein said pouch is mounted onto said race vehicle, and
 wherein said pressurized gas in said gas bladder puts pressure on said collapsible bladder and will force the liquid out of said collapsible bladder through said tubing to said valve when the driver activates said valve.

34. The system of claim 33 wherein said tubing is inserted through a hole in the driver's helmet and said valve is located within the helmet and in close proximity to the driver's mouth.

35. The system of claim 33 wherein said tubing is inserted through the visor area of the driver's helmet and said valve is located within the helmet and in close proximity to the driver's mouth.

36. The system of claim 33 wherein said tubing is inserted under the driver's helmet and said valve is located within the helmet and in close proximity to the driver's mouth.

37. The system of claim 33 wherein said tubing is attached to the driver's racing suit.

38. The system of claim 33 wherein said tubing is attached to the driver's racing suit using hook and loop material.

39. The system of claim 33 wherein said tubing is fastened to said race vehicle so that the tubing will not interfere with the driver operating the race vehicle.

40. The system of claim 33 wherein said valve is a bite valve.

41. The system of claim 33 further comprising a gas canister to provide pressurized gas for the gas bladder.

42. The system of claim 41 wherein said gas is $CO_2$.

43. The system of claim 33 wherein said pouch is mounted to a roll bar in the race vehicle.

44. The system of claim 43 wherein straps are attached to said pouch and connect around said roll bar to hold said pouch on said roll bar.

45. The system of claim 33 wherein said pouch includes a flap to close said pouch and keep said reservoir securely in said pouch.

46. The system of claim 45 wherein said flap is held closed by a fastening apparatus selected from the group consisting of hook and loop material, straps and zippers.

47. The system of claim 33 wherein said fluid is an isotonic sports drink.

48. The system of claim 33 wherein said at least one gel pack is in said reservoir.

49. The system of claim 33 wherein said at least one gel pack is in said pouch.

50. A hydration system for a driver of a race vehicle comprising: .
   a collapsible bladder for holding a liquid;
   at least one gel pack for keeping said liquid cool;
   an insulated pouch for holding said bladder and said gel pack;
   tubing having two ends with one end coupled to said collapsible bladder; and
   a valve connected to the other end of said tubing,
   wherein said pouch is mounted onto said race vehicle, and
   wherein liquid from said collapsible bladder flows through said tubing to said valve when the driver activates said valve.

51. The system of claim 50 wherein said tubing is inserted through a hole in the driver's helmet and said valve is located within the helmet and in close proximity to the driver's mouth.

52. The system of claim 50 wherein said tubing is inserted through the visor area of the driver's helmet and said valve is located within the helmet and in close proximity to the driver's mouth.

53. The system of claim 50 wherein said tubing is inserted under the driver's helmet and said valve is located within the helmet and in close proximity to the driver's mouth.

54. The system of claim 50 wherein said tubing is attached to the driver's racing suit.

55. The system of claim 50 wherein said tubing is fastened to said race vehicle so that the tubing will not interfere with the driver operating the race vehicle.

56. The system of claim 50 wherein said valve is a bite valve.

57. The system of claim 50 wherein said pouch is mounted to a roll bar in the race vehicle.

58. The system of claim 57 wherein straps are attached to said pouch and connect around said roll bar to hold said pouch on said roll bar.

59. The system of claim 50 wherein said pouch includes a flap to close said pouch and keep said bladder securely in said pouch.

60. The system of claim 59 wherein said flap is held closed by a fastening apparatus selected from the group consisting of hook and loop material, straps and zippers.

61. The system of claim 50 wherein said fluid is an isotonic sports drink.

\* \* \* \* \*